United States Patent [19]

Lau et al.

[11] Patent Number: 5,376,709

[45] Date of Patent: * Dec. 27, 1994

[54] METHOD FOR IMPROVING THICKENERS FOR AQUEOUS SYSTEMS

[75] Inventors: Willie Lau, Ambler; Vishnu M. Shah, Hatfield, both of Pa.

[73] Assignee: Rohm and Haas Company, Philadelphia, Pa.

[*] Notice: The portion of the term of this patent subsequent to Aug. 11, 2009 has been disclaimed.

[21] Appl. No.: 30,757

[22] Filed: Mar. 12, 1993

[51] Int. Cl.$^5$ .......................... C08L 3/02; C08L 5/16; C08L 1/26; C09J 4/00

[52] U.S. Cl. ........................ 524/48; 524/44; 106/176

[58] Field of Search ............ 524/48, 44; 106/176

[56] References Cited

U.S. PATENT DOCUMENTS

| | | | |
|---|---|---|---|
| 4,079,028 | 3/1978 | Emmons et al. | 260/29.6 |
| 4,155,892 | 6/1979 | Emmons et al. | 260/29.2 |
| 4,180,491 | 12/1979 | Kim et al. | 260/29.2 |
| 4,426,485 | 1/1984 | Hoy et al. | 524/591 |
| 4,496,708 | 1/1985 | Dahm et al. | 528/76 |
| 4,499,233 | 2/1985 | Tatenbaum et al. | 524/591 |
| 4,920,214 | 4/1990 | Friedman | 536/103 |
| 5,137,571 | 8/1992 | Eisenhart et al. | 106/217 |

FOREIGN PATENT DOCUMENTS

| | | |
|---|---|---|
| 3828031 | 8/1988 | Germany . |
| 6049022 | 8/1983 | Japan . |
| 2189245 | 12/1987 | United Kingdom . |

OTHER PUBLICATIONS

Cyclodextrins Increase Surface Tension and Critical Micelle Concentration of Detergent Solutions, W. Saenger & A. Muller–Fahrnow, Angew Chem. Int. Ed. Egl 27, (1988), No. 3 pp. 393–394.

*Primary Examiner*—Paul R. Michl
*Assistant Examiner*—LaVonda R. DeWitt
*Attorney, Agent, or Firm*—Wendy A. Taylor

[57] ABSTRACT

An improved method is provided for reversibly suppressing the viscosity of an aqueous solution containing a hydrophobically modified thickener by first complexing the hydrophobic moieties of the thickener with a methyl-$\beta$-cyclodextrin and then decomplexing the methyl-$\beta$-cyclodextrin from the thickener once the aqueous solution containing the thickener is added to the aqueous system which is intended to thicken.

2 Claims, No Drawings

METHOD FOR IMPROVING THICKENERS FOR AQUEOUS SYSTEMS

FIELD OF THE INVENTION

This invention relates to a method for improving thickeners for aqueous systems by eliminating the need for organic cosolvents. More particularly, the invention relates to a method of using a methyl-β-cyclodextrin to reversibly complex the hydrophobic moieties on hydrophobically-modified thickener molecules to suppress the viscosity of the aqueous solutions containing such thickeners.

BACKGROUND OF THE INVENTION

Aqueous systems, such as for example coatings containing emulsion polymer binders, typically employ thickeners to obtain the desired degree of viscosity needed for the proper formulation and application of the aqueous system. The general type of thickener used in aqueous systems is referred to in the art by the term "associative." Associative thickeners are so called because the mechanism by which they thicken is believed to involve hydrophobic associations between the hydrophobic moieties on the thickener molecules themselves and/or with other hydrophobic surfaces. A number of different types of associative thickeners are known including, but not limited to hydrophobically-modified polyurethanes, hydrophobically-modified alkali soluble emulsions, hydrophobically-modified hydroxyethyl cellulose or other hydrophobically-modified natural products, and hydrophobically modified polyacrylamides.

Certain of these associative thickeners, such as for example the hydrophobically-modified polyurethane thickeners, are sold as aqueous solutions containing organic cosolvents. The function of the organic cosolvent, such as for example propylene glycol and butyl carbital, is to suppress the viscosity of the aqueous solution containing the associative thickener to allow for ease in its handling before its use as a thickener. While these organic solvents perform their intended function, they possess potential environmental, safety and health disadvantages. Viscosity suppression may also be accomplished by the use of surfactants. While this presents no specific health/environmental hazard, it does degrade paint performance.

U.S. Pat. No. 5,137,571 to Eisenhart et al. discloses a method for reversibly complexing a cyclodextrin, compound with the hydrophobic moieties on a hydrophobically modified thickener to suppress the viscosity of the aqueous solution containing the thickener so that such solutions can be easily handled and then decomplexing the cyclodextrin compound from the thickener to permit the thickener to perform its intended function. Eisenhart et al. disclose that α, β, and γ cyclodextrins can be used effectively to suppress the viscosity of the aqueous solutions of hydrophobically modified thickeners. They also disclose that hydroxyethyl- and hydroxypropyl-cyclodextrins are preferred to the unmodified versions of cyclodextrin.

We unexpectedly have found the methyl-β-cyclodextrin, a modified version of cyclodextrin which was not commericially available until about May 1992 gives superior viscosity suppression as compared to the preferred commericially-available hydroxyethyl cyclodextrin and even as compared to the most preferred commericially-available hydroxypropyl cyclodextrin.

SUMMARY OF THE INVENTION

This invention is directed to an improved method for reversibly suppressing the viscosity of an aqueous solution containing a hydrophobically-modified thickener by first complexing the hydrophobic moieties on the thickener with a methyl-β-cyclodextrin and then decomplexing the methyl-β-cyclodextrin from the thickener once the aqueous solution containing the thickener is added to the aqueous system which is intended to thicken.

DETAILED DESCRIPTION OF THE INVENTION

Cyclodextrin compounds are cyclically-closed oligosaccharides with 6, 7 or 8 α-D-glucoses per macrocycle. The six glucose ring cyclodextrin compound is referred to as an β-cyclodextrin; the 7 glucose ring cyclodextrin compound is referred to as a β-cyclodextrin, and the 8 glucose ring cyclodextrin compound is referred to as a γ-cyclodextrin. Cyclodextrins are produced from starch of any selected plant variety, such as corn, potato, waxy maize, and the like. The starch may be modified or unmodified, derived from cereal or tuber origin and the amylose or amylopectin fractions thereof. The selected starch in the form of an aqueous slurry, at concentrations up to about 35% by weight solids, is usually liquefied, by gelatination or by treatment with a liquefying enzyme such as bacterial α-amylase enzyme, and then subjected to treatment with a transglycosylate enzyme to form the cyclodextrins. The amount of individual α, β and γ cyclodextrins will vary depending on the selected starch, selected transglycolase enzyme and processing conditions. Precipitation and separation of the individual cyclodextrins is described in the literature using solvent systems, inclusion compounds such as trichloroethylene and nonsolvent systems utilizing selected ion exchange resins. β-cyclodextrin is the most widely used form and is known for use in the production of pharamaceuticals and foods.

The ability of cyclodextrins to form inclusion complexes with organic compounds and thereby increase the water solubility of the organic compound is known. In "Cyclodextrins Increase Surface Tension and Critical Micelle Concentrations of Detergent Solutions" by W. Saenger and A. Muller-Fahrnow, *Agnew. Chem. Int. Ed. Egl* 27 (1988) No. 3 at pages 393–394, the authors discuss the ability of the central hydrophobic cavity of the cyclodextrin compounds to accommodate the hydrophobic, aliphatic part of a detergent molecule having a diameter of about 5 Angstroms. Studies with such detergents showed that the cyclodextrins were capable of increasing the surface tension of the detergent molecule and shifting the critical micelle concentration of the detergent to a higher value, thus making the detergent more soluble in water. This was suggested as being beneficial in cases where micelles need to be destroyed or where surface tension needs to be increased, as for example to avoid foaming.

U.K. Patent Application 2,189,245A entitled "Producing Modified Cyclodextrins," published on Oct. 21, 1987, and assigned to American Maize Products Company discloses a method for increasing the water solubility of cyclodextrins. This method involves modification with alkylene carbonates and preferably ethylene carbonate to form hydroxyethyl ethers on the ring structure.

Because cyclodextrin compounds absorb onto or form complexes with hydrophobic species, they can be absorbed onto the hydrophobic moieties of associative thickeners. The absorption of cyclodextrin compounds onto the hydrophobic moieties of associative thickeners causes a suppression of the viscosity of an aqueous solution containing the associative thickener. Cyclodextrin compounds can be readily desorbed or decomplexed from the associative thickener by the addition of another material which has an affinity for the cyclodextrin.

The water solubility limit of methyl-$\beta$-cyclodextrin is about 80 grams per 100 grams of water. This limits the concentration of methyl-$\beta$-cyclodextrin which can be employed to suppress the viscosity of an aqueous solution containing an associative thickener. Since the viscosity of an aqueous solution containing an associative thickener increases with the concentration of the associative thickener solids, the solubility limit of the methyl-$\beta$-cyclodextrin determines the maximum amount which can be added to the solution without resulting in the formation of undesirable solids. If the maximum concentration of the methyl-$\beta$-cyclodextrin needed to reduce the viscosity of an aqueous solution containing an associative thickener to a handleable viscosity, such as for example a viscosity of about 2,000 centipoises, exceeds the solubility limit of the methyl-$\beta$-cyclodextrin in water, then the methyl-$\beta$-cyclodextrin is not effective as a viscosity suppressant additive. In other words, the effectiveness of the methyl-$\beta$-cyclodextrin as a viscosity suppressing additive is a function of the solubility limit of the methyl-$\beta$-cyclodextrin and the solids content of the associative thickener in the aqueous solution. The higher the solids content of the associative thickener the higher the viscosity of the aqueous solution containing it will be, and likewise the higher the concentration of the cyclodextrin which will be needed to be added to suppress the viscosity down to a level where it easily flows.

Applicants have found that the use of methyl-$\beta$-cyclodextrin is useful in latex paint formulation for achieving a variety of effects, such as for example:

- to permit the preparation anti supply of a low viscosity, high solids solution of the thickener without the use of viscosity suppressing solvent;
- to ease incorporating hydrophobically modified, associative thickeners, having marginal solubility in water, into aqueous systems;
- to reduce the viscosity drop of associative thickener containing formulations upon the addition of colorants or surfactants to the formulation;
- to improve the efficiency of the associative thickener itself, thus reducing the thickener required to reach a given paint viscosity;
- to reduce foaming in a paint, with or without an associative thickener, which is especially desirable when the paint is to be applied by a roller; and
- to reduce the color development problems caused by surfactants in some formulations.

The ability to decomplex the methyl-$\beta$-cyclodextrin from the hydrophobic associative thickener is just as important as the ability of the methyl-$\beta$-cyclodextrin to absorb or complex with the associative thickener in the first instance. It is critical for the thickener to perform its intended viscosity increasing function in the aqueous system to which the associative thickener solution is added that the cyclodextrin becomes decomplexed or desorbed from the hydrophobic moieties on the associative thickener molecule. We have found that methyl-$\beta$-cyclodextrin is readily desorbed or decomplexed from hydrophobic associative thickeners simply by the addition of a material which has an affinity for the cyclodextrin. In this regard, we have found that conventional surface active agents commonly present in aqueous coating systems including, anionic surfactants such as sodium lauryl sulfate, nonionic surfactants such as IGEPAL ® CO-660 (a 10 mole ethoxylate of nonyl phenol), and cationic surfactants, may be used to decomplex or desorb the cyclodextrin. Other water soluble organic solvents such as for example ethanol and TEXANOL ® solvent may also be employed for this purpose but are not preferred. We have found that it is preferred to utilize about one mole of the decomplexing agent per mole of the methyl-$\beta$-cyclodextrin added to the associative thickener solution to achieve complete desorption or decomplexation.

Both the complexation and decomplexation mechanisms are easily achieved by the addition of the reactants with mixing. No special purification or separation steps are required at room temperature. In our work, it was not necessary to add additional surfactant to cause this decomplexation process to occur; the formulation surfactants already present in the paint have been found to be sufficient.

The surfactant complexing effect of the cyclodextrins are also of benefit to the formulator for other properties than rheological modification. Typically when formulating tinted paints, the composition of the formulation, specifically the surfactants, must be modified to maintain the stability of the colorant dispersion while not adversely affecting the dispersion of the other components. In some formulations, the paint components, such as the latex vehicle, bring an incompatible surfactant into the formulation. To correct for this, additional surfactants are added to the formulation to compatibilize the system. While effective in compatibilizing the system, these surfactants can contribute adverse water sensitivity and foaming characteristics to the formulation. Methyl-$\beta$-cyclodextrin is useful in improving the compatibility of a colorant without adding additional surfactants.

The following examples are intended to illustrate the invention and are not intended nor should they be interpreted as limiting the scope of the invention since modifications to the process illustrated are considered to be obvious to one of ordinary skill in the art.

EXAMPLE 1

THICKENERS IN WATER

The methyl-$\beta$-cyclodextrin was tested to demonstrate that it suppressed the viscosity of an hydrophobically modified thickener in water better than preferred commericially-available hydroxyethyl cyclodextrin and most preferred commericially-available hydroxypropyl cyclodextrin.

4.9 grams of each cyclodextrin material were mixed with 77.6 grams of water and then 17.5 grams of ACRYSOL ® RM-8 solid grade hydrophobically modified polyurethane thickener was added and mixed. The low shear viscosity of the resultant mixture was measured using an Brookfield viscometer. The results are reported in Table 1.1 in centipoises.

TABLE 1.1

| | Viscosity (centipoises) |
|---|---|
| Methyl-$\beta$-cyclodextrin (Wacker) | 802 |
| COMPARATIVES | |
| Hydroxypropyl-$\alpha$-cyclodextrin HP 0.6 (Wacker) | 19,200 |
| Hydroxypropyl-$\beta$-cyclodextrin HP 0.9 (Wacker) | 5,240 |
| Hydroxypropyl-$\beta$-cyclodextrin (American Maize) | 2,820 |
| Hydroxypropyl-$\gamma$-cyclodextrin HP 0.6 (Wacker) | >100,000 |

EXAMPLE 2
THICKENERS IN PAINT FORMULATIONS

Paints with hydrophobically modified thickener complexed with cyclodextrin materials were formulated to demonstrate that the methyl$\beta$-cyclodextrin does not adversely affect the other properties of the paint formulation as compared to the other cyclodextrin materials.

The ingredients in Table 2.1 (in grams) were used to formulate the paints. In a container, the grind ingredients were first mixed together at high speed with Cowles dissolver and then the letdown ingredients were added and mixed at a low speed. In a separate container, the cyclodextrin material and appropriate water portion were mixed together and then the thickener was added and mixed until homogeneous. The complexed thickener mixture was then added to the grind and letdown mixture.

The anionic surfactant present in the paint formulations was sufficient to decomplex the cyclodextrin materials from the thickener. Therefore, no additional surfactant needed to be added to the formulations.

EXAMPLE 3
TESTING OF THICKENERS IN PAINT FORMULATIONS

Several tests were performed to demonstrate that while the method of the present invention gives superior viscosity suppression as compared to other cyclodextrin materials, the method of the present invention does not detrimentally affect other properties of the paint formulation.

EFFICIENCY

The efficiency of the thickener which had been complexed with a cyclodextrin material was measured by determining the amount of dry pounds of thickener that was required to thicken 100 gallons of the paint formulation to about a targeted 95 Krebs Units stormer viscosity. The efficiency data are reported in Table 3.1 in dry pounds.

ICI VISCOSITY

The high shear viscosity of the paints were measured using an ICI Viscometer. The viscosity measurements are reported in Table 3.1 in poise.

LENETA FLOW

The flow and leveling of each paint were determined. Each paint was applied to a separate Leneta sealed 12H chart at 25° C. and positioned horizontally to dry overnight. The dried charts were compared to reference standards in a Leneta Level-Luminator. The flow and leveling results are reported in Table 3.1 as the number of the reference standard which most nearly matched the appearance of each paint.

TABLE 2.1

| Ingredient | Paint 1 | Paint 2* | Paint 3* | Paint 4* | Paint 5* | Paint 6¥ |
|---|---|---|---|---|---|---|
| Grind | | | | | | |
| Water | 45.00 | 45.00 | 45.00 | 45.00 | 45.00 | 45.00 |
| Coalescent (propylene glycol) | 70.00 | 70.00 | 70.00 | 70.00 | 70.00 | 70.00 |
| Dispersant (Tamol ® SG-1) (35%) | 12.35 | 12.35 | 12.35 | 12.35 | 12.35 | 12.35 |
| Antifoaming agent (Foamaster VL) | 1.00 | 1.00 | 1.00 | 1.00 | 1.00 | 1.00 |
| Titanium dioxide (Ti-Pure ® R-900) | 209.99 | 209.99 | 209.99 | 209.99 | 209.99 | 209.99 |
| Extender (ASP-170) | 88.02 | 88.02 | 88.02 | 88.02 | 88.02 | 88.02 |
| Letdown | | | | | | |
| Water | 116.70 | 116.70 | 116.70 | 116.70 | 116.70 | 116.70 |
| Acrylic latex emulsion (Rhoplex ® AC-264) (60.5% solids) | 378.00 | 378.00 | 378.00 | 378.00 | 378.00 | 378.00 |
| Coalescent (Texanol ®) (2,2,4-trimethyl-3-hydroxypentyl acetate) | 11.43 | 11.43 | 11.43 | 11.43 | 11.43 | 11.43 |
| Antifoaming agent (Foamester VL) | 3.00 | 3.00 | 3.00 | 3.00 | 3.00 | 3.00 |
| Thickener/Cyclodextrin | | | | | | |
| Hydrophobically-modified Polyurethane Thickener (100% solids) | 1.67 | 1.71 | 1.66 | 1.38 | 1.33 | 1.68 |
| Water | 132.58 | 132.27 | 132.33 | 132.69 | 132.76 | 131.52 |
| Cyclodextrin (solid grade) | | | | | | |
| Methyl-$\beta$-cyclodextrin (Wacker) | 0.41 | — | — | — | — | — |
| Hydroxypropyl-$\alpha$-cyclodextrin (Wacker) | — | 0.48 | — | — | — | — |
| Hydroxypropyl-$\beta$-cyclodextrin (Wacker) | — | — | 0.47 | — | — | — |
| Hydroxypropyl-$\beta$-cyclodextrin (American Maize) | — | — | — | 0.39 | — | — |
| Hydroxypropyl-$\gamma$-cyclodextrin (Wacker) | — | — | — | — | 0.37 | — |
| Butyl carbitol | — | — | — | — | — | 1.26 |

*Comparatives
¥ Control (no cyclodextrin premixed with thickenr)

LENETA SAG

The sag of each paint was determined. Each paint was applied with a drawdown bar to a separate Leneta sealed 12H chart having a water-soluble ink line (drawn perpendicular to the length of the chart) at 25° C. and hung vertically to dry overnight. The dried charts were rated by the highest thickeness (measured in mils) at which the paint sagged beyond the water-soluble ink line by less than 0.5 centimeter. The sag results are reported in Table 3.1.

GLOSS (60° and 85°)

The gloss of each paint was measured. Each paint was drawndown on a Leneta 5C chart with a 3 mil Bird film applicator and dried at constant temperature and humidity for 7 days. The gloss of each paint was measured on a Hunter Glossmeter at 60° and 85°, according to ASTM D-523-89 Test Method. The gloss results are reported in Table 3.1.

COLORANT STABILITY

The stability of each paint was measured before and after the addition of 2 ounces/gallon of Lamp Black colorant with a Krebs-stormer viscometer. The viscosity results and the delta values are reported in Table 3.1.

HEAT AGE STABILITY

The stability of each paint was measured before and after the aging at 140° F. for 10 days with a Krebs-stormer viscometer. The viscosity results and the delta values are reported in Table 3.1.

TABLE 3.1

|  | Paint 1 | Paint 2* | Paint 3* | Paint 4* | Paint 5* | Paint 6 ¥ |
|---|---|---|---|---|---|---|
| Effieciency (dry pounds/100 gallons paint) | 1.38 | 1.71 | 1.66 | 1.33 | 1.47 | 1.68 |
| Sormer Viscosity (KU) | 93 | 96 | 96 | 96 | 96 |  |
| ICI Viscosity (KU) | 0.6 | 0.6 | 0.7 | 0.6 | 0.6 | 0.6 |
| Leneta Flow | 9 | 9 | 9 | 9 | 9 | 9 |
| Leneta Sag | 8 | 8 | 8 | 8 | 8 | 8 |
| Gloss | | | | | | |
| 60° | 40 | 39 | 40 | 40 | 39 | 39 |
| 85° | 88 | 86 | 88 | 87 | 86 | 88 |
| Color Stability | | | | | | |
| Initial Stormer Viscosity (KU) | 101 | 106 | 106 | 106 | 106 | 106 |
| Final Stormer Viscosity (KU) | 80 | 83 | 83 | 83 | 83 | 83 |
| Delta (KU) | −21 | −23 | −23 | −23 | −23 | −23 |
| Heat Age Stability | | | | | | |
| Initial Stormer Viscosity (KU) | 101 | 106 | 106 | 106 | 106 | 106 |
| Final Stormer Viscosity (KU) | 109 | 110 | 109 | 110 | 114 | 118 |
| Delta (KU) | +8 | +4 | +3 | +4 | +8 | +12 |

*Comparatives
¥ Control (no cyclodextrin premixed with thickenr)

We claim:

1. A method for eliminating the need for organic solvents by hydrophobic thickeners useful for thickening aqueous systems containing a water-insoluble polymer, comprising:
   (a) admixing methyl-β-cyclodextrin having hydrophobic groups with a hydrophobic thickener selected from the group consisting of hydrophobically modified polyethoxylated urethanes, hydrophobically modified alkali soluble emulsions, hydrophobically modified hydroxyethyl cellulose and hydrophobically modified polyacrylanides, where said methyl-β-cyclodextrin is admixed in an amount effective to complex the hydrophobic groups of said methyl-β-cyclodextrin with the hydrophobic groups of said hydrophobic thickener;
   (b) adding said complexed admixture to said aqueous system containing a water-insoluble polymer; and
   (c) adding to said aqueous system containing said complexed admixture and said water-insoluble polymer, a surfactant selected from the group consisting of an anionic, nonionic and cationic surfactant, where said surfactant is added in an amount effective to decomplex the hydrophobic groups of said methyl-β-cyclodextrin from the hydrophobic groups of said hydrophobic thickener.

2. The method of claim 1 wherein said surfactant is added to said aqueous system at a concentration of about one mole per mole of said methyl-β-cyclodextrin.

* * * * *

UNITED STATES PATENT AND TRADEMARK OFFICE
CERTIFICATE OF CORRECTION

PATENT NO. : 5,376,709

DATED : December 27, 1994

INVENTOR(S) : Willie Lau and Vishnu M. Shah

It is certified that error appears in the above-identified patent and that said Letters Patent is hereby corrected as shown below:

In column 2, line 20, change "$\beta$-cyclodextrin" to "$\alpha$-cyclodextrin"

In column 3, line 5, change "The: absorption" to "The absorption".

In column 3, line 45, change "anti" to "and".

In column 3, line 50, change "marginal: solubility" to "marginal solubility".

In Table 3.1, next to "Sormer Viscosity (KU) 93", shift the column starting with "93" to the right so that the "93" aligns under the heading "Paint 1" and a "96" aligns under the remaining headings (Paint 2, Paint 3, Paint 4, Paint 5 and Paint 6).

Signed and Sealed this

Second Day of May, 1995

Attest:

BRUCE LEHMAN

Attesting Officer

Commissioner of Patents and Trademarks